US006205900B1

(12) United States Patent
Heck et al.

(10) Patent No.: US 6,205,900 B1
(45) Date of Patent: Mar. 27, 2001

(54) AUTOMATIC SECTIONIZER

(75) Inventors: Richard D. Heck, Hesperia; Henry A. Affeldt, Apple Valley, both of CA (US)

(73) Assignee: Sunkist Growers, Inc., Ontario, CA (US)

( * ) Notice: Subject to any disclaimer, the term of this patent is extended or adjusted under 35 U.S.C. 154(b) by 0 days.

(21) Appl. No.: 09/350,794

(22) Filed: Jul. 9, 1999

(51) Int. Cl.[7] .............................. B26D 5/08; A23N 15/00

(52) U.S. Cl. ................................ 83/551; 83/627; 83/628; 83/932; 99/537; 99/538

(58) Field of Search ........................ 99/537, 538; 30/114, 30/117, 123.5, 303, 304; 83/167, 551, 552, 559, 560, 620, 621, 628, 694, 695, 697, 932, 437, 451

(56) References Cited

U.S. PATENT DOCUMENTS 2,612,853 * 10/1952 Bale, Jr. ................................ 83/621
3,143,912 * 8/1964 Vogel et al. ........................... 83/628
5,038,649 * 8/1991 Hopglin ................................ 83/932
5,293,803 * 3/1994 Foster .................................. 83/932
5,415,083 * 5/1995 Nagaoka ............................ 99/537 X
5,467,707 * 11/1995 Kanamaru .............................. 83/628

* cited by examiner

*Primary Examiner*—W. Donald Bray
(74) *Attorney, Agent, or Firm*—Sheppard, Mullin, Richter & Hampton LLP

(57) ABSTRACT

An automatic food product cutting apparatus is provided that employs a continuously rotating table arranged with multiple cutter cups, each cup being aligned with a plunger that rotates with the table. The plungers are driven to force fruit through the cup and to withdraw from the cup by cam following rollers that follow a generally elliptical cam track. The cam track is concentric to but does not rotate with the table. With this arrangement, a single drive motor is used to power both the rotation of the table and the plunging force to push the food product through the cutter cups, thereby achieving smooth, continuous operation.

32 Claims, 3 Drawing Sheets

AUTOMATIC SECTIONIZER

BACKGROUND OF THE INVENTION

The present invention relates to a slicing or sectionizing apparatus, and more particularly to an apparatus for automatically and continuously cutting food products.

In the commercial preparation of food products, especially fruit products for the food service industry, it is often necessary or desirable to cut the fruit or other products into some predetermined form or shape. For example, in the case of citrus fruit, it is common for a commercial kitchen to employ hand laborers to slice fruit into wedges or segments for presentation with a meal. Also, it is common for restaurants, hotel kitchens, or other institutional kitchens to slice citrus fruit transversely into "wheels" for presentation in or as a garnish with beverages. This is particularly common in providing "lemon wheels" for presentation in ice water at upscale hotels and restaurants.

Since preparation of fruit sections or wheels is highly labor intensive, it is desirable to provide a mechanism that can perform this task automatically. Prior devices that have been used for this purpose have been of two general types. Manual sectionizers are slow, single fruit devices with one cutting barrel or cup. While these devices are adaptable to cut either sections or slices, they cannot produce the volume of production required in a modern commercial kitchen. Automatic devices, while faster than the manual sectionizers, are still too slow. They are stop-and-go single or multiple plunger units, usually requiring special air supplies to operate. Moreover, they are large and cumbersome and consume significant space in commercial facilities, making them less adaptable to existing layouts. Stop-and-go units typically require multiple power sources with special mechanisms to ensure alignment of the cutting barrel and plunger.

SUMMARY OF THE INVENTION

It is therefore an object of the present invention to provide a novel food product cutting apparatus that overcomes the problems experienced with prior devices.

A primary object of the invention is to provide an automatic food cutter that is effective and efficient in the setting of a commercial foodservice operation, such as an institutional kitchen.

Another object of the invention is to provide a food cutting device that is capable of continuous, smooth and quiet, high volume operation that uses a single conventional power source to provide both the high speed operation and the motive force to cut the food products.

Another object of the invention is to provide a food cutting device that is capable of performing a variety of different cutting operations and which is capable of operating at a wide variety of different speeds.

Another object of the invention is to provide a versatile food cutting device that can operate on a variety of food products, is moveable, requires a minimum of space, and is easily adaptable to current equipment layouts.

It is yet another object of the invention to provide a food product cutting apparatus that is capable of achieving the above objects and is still easy to clean and maintain, and is efficient in operation.

These and other objects of the invention are achieved by providing an automatic food product cutting device that employs a continuously rotating table arranged with multiple cutting cups, each cup being aligned with a plunger that rotates with the table. The plungers are driven to force product through the cup and to withdraw from the cup by cam following rollers that follow a generally elliptical cam track. The cam track is concentric to, but does not rotate with, the rotating table. With this arrangement, a single drive motor is used to power both the rotation of the table and the plunging force to push the product through the cutter cups, thereby achieving smooth, continuous operation.

In the cutting apparatus of the present invention, the table rotates through a loading station and a cutting station, and the plungers are caused to move away from the cutter cups at the loading station and toward, into, and through the cutter cups at the cutting station. The cam track is not perfectly elliptical, but instead is arranged to hold the plungers at or near their maximum distance from the cutters while the cutters pass through the loading station, and to accelerate the product downwardly through the cutters at the cutting station. For safety purposes, the cam track includes a ledge to prevent a plunger from moving toward the cutters as the cutters pass through the loading station, and the loading station is provided with contact switches at each side to stop operation of the apparatus if the switches are contacted. The cutting apparatus is also provided with a receptacle to receive cut product and a conveyor to remove the cut product from the receptacle. If desired, the apparatus can be provided with a product feeding mechanism to supply product to the loading station automatically.

In addition, the cutters of the present invention are comprised of removable cups that contain an array of cutting blades. A flexible support membrane extends across the top of the cup to releasably receive and support the product for cutting. The cups are removable and replaceable to permit use of different configurations of the array of cutting blades. The plungers are provided with plunger heads that contact and push the product through the cutters. These plunger heads are also removable and replaceable to accommodate different configurations of the blade arrays. The apparatus includes a pair of guide plates mounted on the same axis as the table for synchronous rotation with the table and for the purpose of guiding each plunger toward and away from its respective cutter cup.

These and other aspects of the invention will be more apparent from the following description of the preferred embodiment thereof when considered in connection with the accompanying drawings and appended claims.

BRIEF DESCRIPTION OF THE DRAWINGS

The present invention is illustrated by way of example and not limitation in the accompanying drawings in which like references indicate similar parts, and in which.

DETAILED DESCRIPTION OF THE PREFERRED EMBODIMENT

Figure 1:
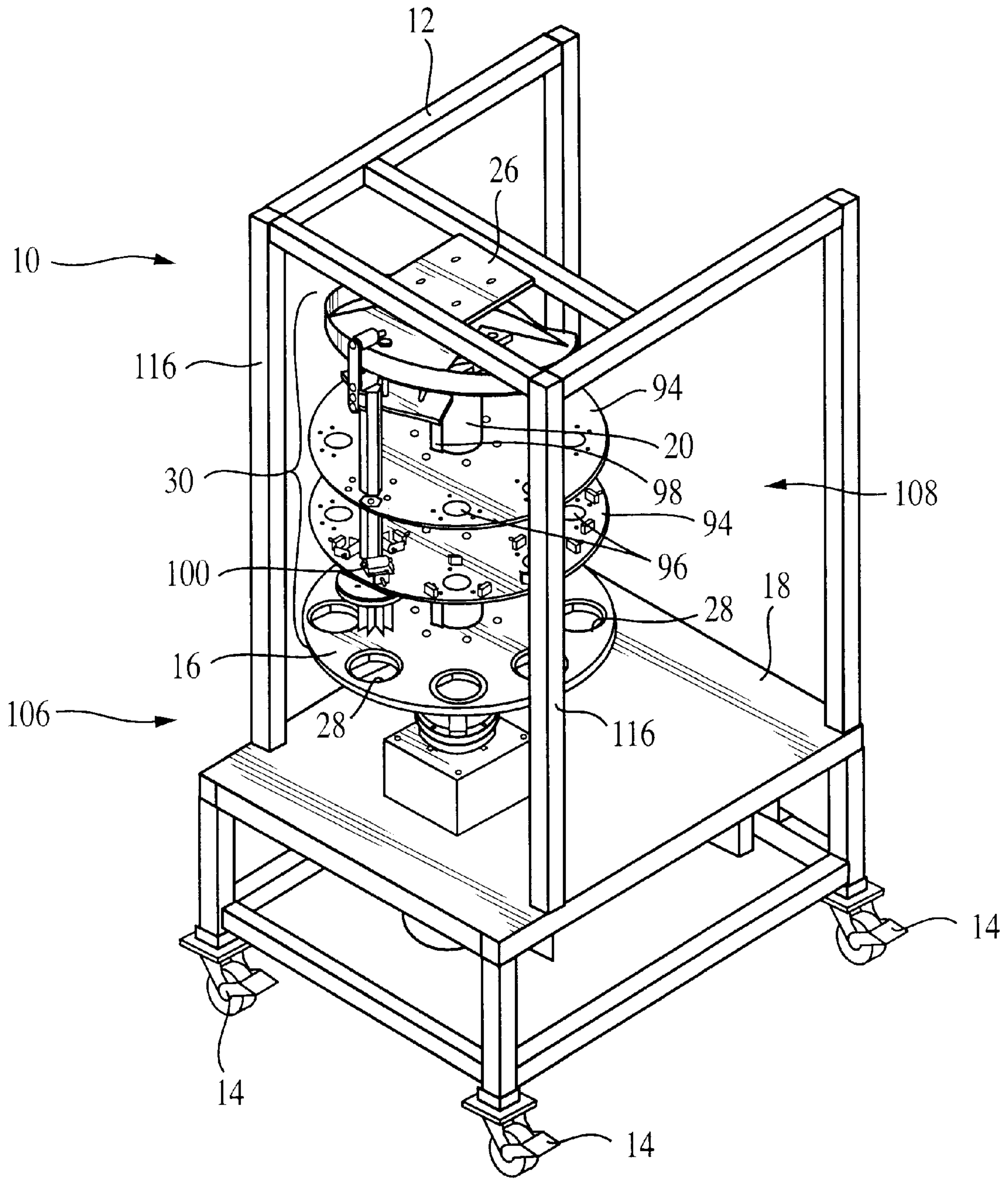
FIG. 1 is a perspective view of the of the present invention shown partly assembled to more clearly depict certain parts thereof.
Figure 6:
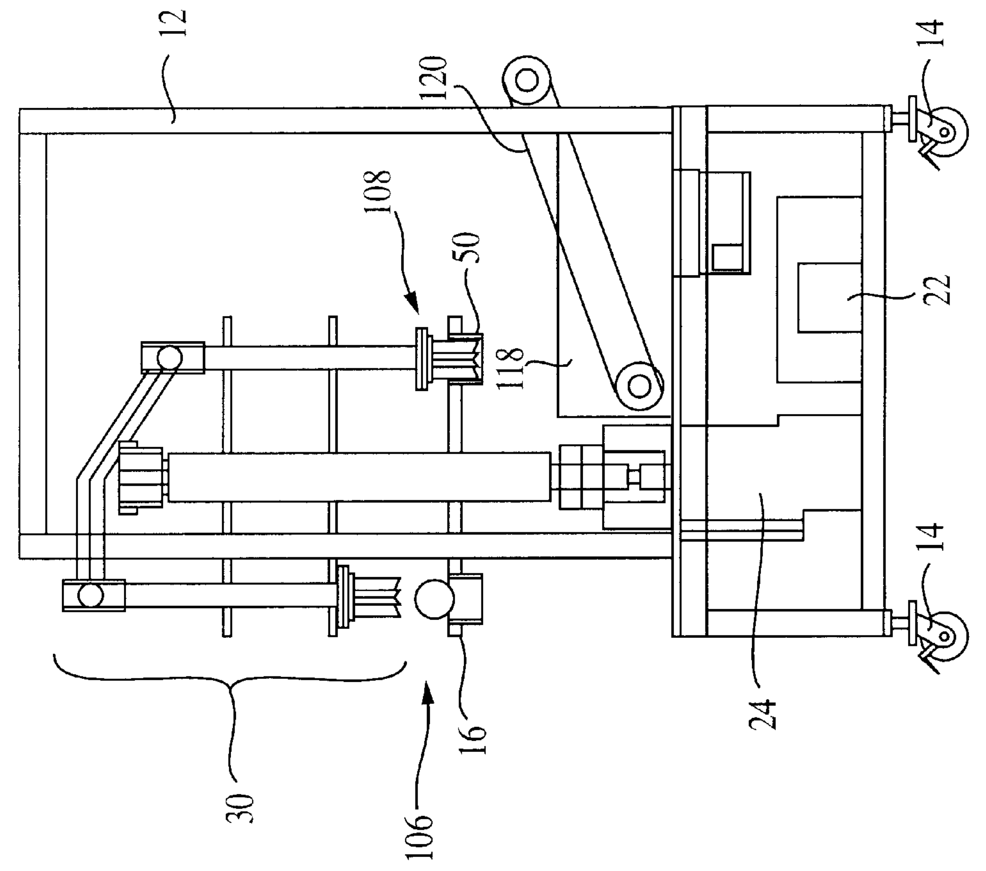
FIG. 6 is a side elevational view of the cutting apparatus showing the motor and gearbox, and showing the receptacle and conveyor for removing product from the apparatus.

A partially assembled food product cutting apparatus is generally shown at 10 in FIG. 1 and is comprised of a frame 12 arranged to be moveable on locking casters 14. A rotary table 16 is mounted for rotation above a platform 18 on the frame 12 and is arranged to rotate in a horizontal plane by being secured to a central rotating axle center rotary shaft 20. The axle center rotary shaft 20 could be a stationary post with the table mounted for rotation by a conventional bearing and being driven by, for example, a gear track around the periphery of the table. However, in the preferred embodiment of the invention, the table is rigidly secured to the central axle center rotary shaft 20, and the axle center rotary shaft 20 is driven by a motor 22 and gearbox 24 to provide the motive force to rotate the table 16. The motor 22 and gearbox 24 are best seen in FIG. 6. The upper end of the axle center rotary shaft 20 is rotatably received in a bearing (not shown in FIG. 1) that is ultimately secured to a plate 26 that is formed as part of the frame 12.

The table 16 shown in FIG. 1 has eight evenly spaced apertures 28 in which an array of cutting cups (not shown in FIG. 1) are positioned. Positioned over each aperture 28 is a plunger assembly 30, which is moveable toward and away from the aperture 28 in a manner that will be described in more detail below. The purpose of this motion is to force food products through the apertures 28, and the cutter cups positioned therein, to perform the cutting operation of the apparatus 10. For clarity of illustration, only one plunger assembly has been shown in FIG. 1, but it will be noted that a separate plunger assembly 30 is provided for each aperture 28 in the table 16.

Figure 2:
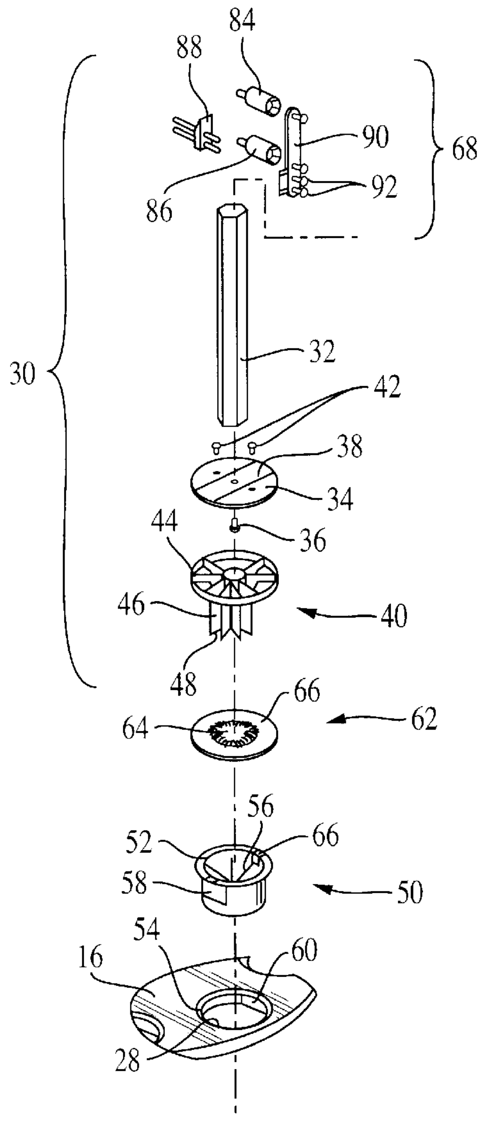
FIG. 2 is an exploded view of the plunger of the present invention, showing its relation to the support membrane, cutter, and rotating table.

The detailed structure of the plunger assembly 30 is best illustrated in FIG. 2. The plunger assembly 30 is comprised of a shaft 32, preferably having a hexagonal cross section, that has a plunger head mounting bracket 34 secured to its lower end by a machine screw 36. To prevent rotation of the bracket 34 with respect to the shaft 32, the bracket has a groove or slot 38 that aligns with the flats of the shaft 32. A removable plunger head, indicated generally at 40, is attached to the mounting bracket 34 by a pair of machine screws 42. The plunger head 40 can be molded as a single piece, including a base section 44 that has a pair of threaded holes for receiving the screws 42. Extending downwardly from the base section 44 are a series of product contacting fingers 46 arranged to cooperate with the array of cutting blades located in the apertures 28. The fingers 46 have product contacting surfaces 48 that are angled inwardly to contact and control the food product to be cut as nearly as possible toward the center of the aperture 28.

In order to removably hold the aforementioned array of cutting blades in the apertures 28, a cutter blade cup 50 is received in the aperture 28. The cutter cup 50 has an upper flange 52 that is received in a recess 54 formed around the aperture 28. The array of cutting blades 56 is disposed in the interior of the cup 50 and can be of any desired configuration. For example, to create wedge sections of fruit, two, three or more blades extending across the diameter of the cup 50 would be spaced radially evenly from one another. To core and create wedge sections of fruit, three, four or more blades extending from a central cylindrical blade would be spaced radially evenly from one another. To create slices, a series of blades would extend across the interior of the cup 50 parallel to one another and spaced any desired distance apart. In order to ensure that the cup 50 is oriented in the proper relationship to the plunger head 40, the cup 50 includes one or more keys 58 that cooperate with a recess 60 in the aperture 28.

To hold the food product to be cut in position above the cup 50, a flexible support 62 is secured to the top of the cup 50. The flexible support 62 includes inwardly extending fingers 64 that are sufficiently rigid to support the product to be cut, such as a citrus fruit. The fingers are sufficiently flexible to yield to the force of the plunger 30 and allow the product to be forced through the support 62, and into and through the cutter cup 50. The support 62 is preferably secured to the cup 50 by mating of a ridge formed around the top lip of cup 50 and a groove formed in support 62 and is aligned by pins, formed in cup 50, and fitting into holes 66. If desired, the support 62 and the cup 50 can be secured to the table 16 by these same screws passing through the flange 52 and the recess 54 in the aperture 28.

For the purpose of driving the plunger assemblies 30 toward and away from the cutter cups 50, a cam track following roller assembly 68 is provided at the top of the plunger assembly 30. For a clearer understanding of the roller assembly 68, reference will be made to FIGS. 3 and 4, which illustrate the cam track, indicated generally at 70, in more detail.

Figure 3:
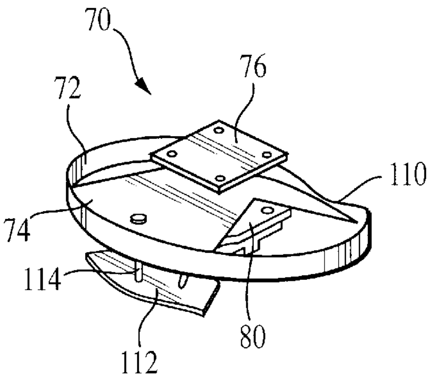
FIG. 3 is a perspective view of the cam track of the present invention.
Figure 4:
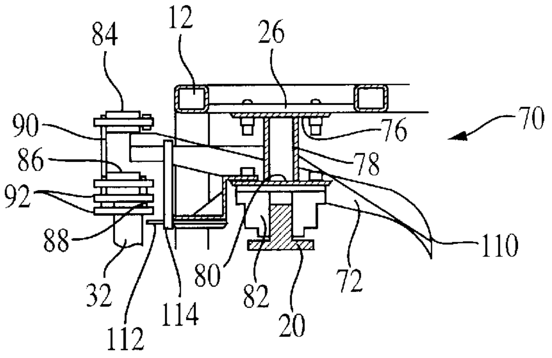
FIG. 4 is a side elevational view of the cam track, taken partly in section, and showing the cam follower, safety ledge, and the cam track's relation to the frame and central rotating axis of the present invention.

FIG. 3 is a perspective view of the cam track taken in the same direction as seen in FIG. 1. It can be seen that the cam track consists of an annular curved track 72 supported by an internal web 74. The entire assembly is suspended from the frame 12 by an upper plate 76 that is bolted to plate 26 of the frame 12 (FIG. 4). At the lower end of a central post 78 of the cam track 70 is a lower plate 80 that provides support for the upper end of the central rotating axle center rotary shaft 20. For this purpose, a bearing 82 is secured to the lower plate 80, and the upper end of the axle center rotary shaft 20 is rotatably received in the bearing 82.

With this arrangement, it can be seen that the cam track 70 will remain stationary with respect to the frame while the table 16 and axle center rotary shaft 20 rotate below it. Since the plunger assembly 30 also rotates with the table 16 and axle center rotary shaft 20, the roller assembly 68 will cause the plunger assembly to change elevation in accordance with the geometry of the curved cam track 72. Viewed from directly above, the cam track 72 would appear to be circular and concentric with the axle center rotary shaft 20.

As can be seen in both FIGS. 3 and 4, the actual path of the track 72 is set generally on a plane that is oblique to the axle center rotary shaft 20, and is therefore referred to as being generally elliptical. When reference is made to the path of the track 72 as being generally elliptical, it must be understood that the preferred path of the track 72 is not actually an ellipse. Rather, in the preferred embodiment of the present invention, the geometry of the track 72 is arranged to achieve specific motion of the plunger assembly 30, which will be described in more detail below.

The structure of the cam track following roller assembly 68 is best illustrated in FIGS. 2 and 4. The roller assembly 68 is comprised of an upper roller 84 and lower roller 86 that are secured to the plunger shaft 32 by an inside plate 88 and an outside plate 90. Both plates 88 and 90 are fastened to the shaft 32 by bolts 92, but the inside plate 88 extends only up to the lower roller 86, and the outside plate 90 extends up to secure both the lower and the upper rollers 86 and 84. This is because if the inside plate 88 extended up to the upper roller 84, it would interfere with the internal web 74 of the cam track 70.

In order to guide the plunger assemblies 30 toward and away from the cups 50, and referring again to FIG. 1, the shafts 32 of the plunger assemblies 30 pass through a pair of guide plates 94. The plunger guide plates 94 are spaced vertically above the table 16 and are secured to the central axle center rotary shaft 20 for synchronous rotation with the table 16. Each of the guide plates 94 has a series of apertures 96 aligned with the apertures 28 in the table 16. The table 16 and the plates 94 are keyed to the central axle center rotary shaft 20 by a key 98 that ensures synchronous rotation of the table and plates, and constant alignment of the plungers 30 with the cutter cups 50.

Figure 5:
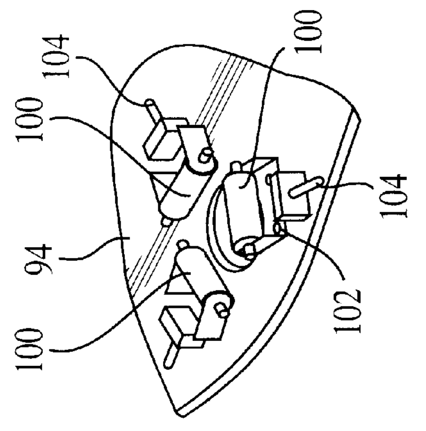
FIG. 5 is a fragmentary view of the guide plate of the present invention showing the preferred roller bearing arrangement for guiding the plunger shaft.

As can best be seen in FIGS. 1 and 2, the plunger shaft 32 is preferably hexagonal in cross section, and each of the apertures 96 in the guide plates 94 is provided with a group of roller bearings 100. The roller bearings are arranged to bear against surfaces of the shafts 32 to keep the plungers 30 in alignment with the cups 50. FIG. 5 illustrates the detail of the roller bearings 100 and shows that they are secured to the plate 94 by screws 102 after they have been carefully positioned by set screws 104.

In operation, referring again to FIG. 1, food products to be cut into desired shapes by the apparatus 10 are received at a loading station, indicated generally at 106. The food products are received on the flexible support 62 for transport to a cutting station, indicated generally at 108. As a cutting cup 50 passes through the loading station 106, an operator places a piece of product to be cut, such as a whole citrus fruit, on the flexible support 62 covering the cup 50. As the table proceeds in its rotary motion, the cam following rollers 84 and 86 follow the curved track 72 and force the plunger assembly 30 downwardly toward the cutter cup 50. More specifically, in order to facilitate loading of product onto the flexible support 62 and cutter cup 50, the annular track 72 is arranged to hold the plunger assembly 30 at or near its greatest distance from the cup 50 while the cup passes through the loading station 106. After clearing the loading station 106, the track 72 resumes its generally elliptical path until it approaches the cutting station 108. At the cutting station 108, the cam track 72 takes a pronounced dip downwardly as at 110 in order to cause the fingers 46 to accelerate the product being cut through and out of the cutter cup 50. After passing through the cutting station 108, the cam track 72 resumes its generally elliptical path to return the plunger assembly 30 to its position spaced above the cutter cup 50 to receive another product at the loading station 106. It will be noted that the cam track 72 is shown as being symmetrical on its path to and from the cutting station. While this is the preferred form of the track 72, it is not necessary to achieve the desired results of the present invention.

In order to enhance safe operation of the apparatus 10, a safety ledge 112 can be provided on the cam track 70. As best seen in FIG. 4, the safety ledge protrudes beneath the inside plate 88 and bolts 92 of the cam track following roller assembly 68 while the plunger assembly passes through the loading station 106. The ledge 112 is secured to the cam track 70 by being bolted to the lower plate 80 and by a spacer and pair of bolts 114 extending from the internal web 74. With this arrangement, should the outside plate 90 or upper roller 84 of the cam track following roller assembly 68 fail while the plunger assembly 30 is passing through the loading station 106, the ledge 112 would catch the inside plate 88 and bolts 92 and prevent the plunger assembly 30 from falling toward the cutter cup 50 at a time when the operator is likely to have his hand between the plunger and the cup. To further enhance the safe operation of the apparatus 10, contact switches (not shown) can be located along the inside of vertical frame members 116, or at any other suitable position defining the loading station 106. If the operator or any object touches either of these switches, the apparatus 10 will come to an immediate stop.

To remove finished cut product from the apparatus 10, as best illustrated in FIG. 6, a catching tank 118 and conveyor 120 are provided. Cut product is ejected from the bottom of the cutter cup 50 at the cutting station 108 and falls into the tank 118, which may, if desired, contain a water bath and may or may not include some treatment material. The removal conveyor 120 then transfers the cut product from the bath away from the apparatus 10 for packaging or further processing. If desired, an automatic feeder (not shown) can be provided at the loading station 106 to automatically provide product to the loading station for cutting by the apparatus 10.

In the preferred embodiment, the rotary table 16 is formed of ultra high molecular weight polyethylene, and the plunger guide plates 94 are formed of stainless steel. Although any desired number of cutter cups 50 can be arranged on the table 16, with eight cups as shown, a rotational speed of between about 7 to 11 revolutions per minute is preferred. For this purpose, the apparatus is preferably provided with a control so that the operator can adjust the rotational speed of the apparatus from about 4 to 15 R.P.M. If automatic supply of product is used, the rotational speed could be much higher.

Although the apparatus has been discussed as being intended for use in sectionizing or slicing citrus fruit, it will be understood that the present invention would be suitable for cutting many other food products such as apples or pears. If desired, the apparatus 10 could be used to cut product that has already been subjected to some processing, such as pitted stone fruit or fruit halves. In addition, the apparatus of the present invention is moveable on the locking casters 14, occupies minimal space, and because the cups and plunger heads are removable, the apparatus is easy to clean and service.

Various modifications and changes may be made by those having ordinary skill in the art without departing from the spirit and scope of the invention. Therefore, it must be understood that the illustrated embodiment has been set forth only for the purpose of example, and that it should not be taken as limiting the invention as defined in the following claims.

The words used in this specification to describe the present invention are to be understood not only in the sense of their commonly defined meanings, but to include by special definition, structure, material, or acts beyond the scope of the commonly defined meanings. The definitions of the words or elements of the following claims are, therefore, defined in this specification to include not only the combination of elements which are literally set forth, but all equivalent structure, material, or acts for performing substantially the same fiction in substantially the same way to obtain substantially the same result.

In addition to the equivalents of the claimed elements, obvious substitutions now or later known to one of ordinary skill in the art are defined to be within the scope of the defined elements.

The claims are thus to be understood to include what is specifically illustrated and described above, what is conceptually equivalent, what can be obviously substituted, and also what essentially incorporates the essential idea of the invention.

We claim:

1. An apparatus for cutting food products, said apparatus comprising:

a continuously rotating table having a plurality of cutters arranged thereon for receiving and cutting said products, said cutters including an array of cutting blades;

a plurality of plungers arranged to rotate with said table, each plunger being aligned with one of said cutters and being constrained to move toward and away from said cutter, each of said plungers including a plunger head that contacts the product and forces the product through said array of cutting blades; and a plunger actuator means mounted on said apparatus, not rotatable with said table, and arranged to cooperate with said plungers to move said plungers toward and away from said cutters.

2. The apparatus of claim 1 wherein said plunger actuator means is a generally elliptical cam track.

3. The apparatus of claim 1 wherein each of said plungers includes means for cooperating with said plunger actuator means.

4. The apparatus of claim 3 wherein said plunger actuator means is a generally elliptical cam track and wherein said means on said plungers includes at least one cam track follower.

5. The apparatus of claim 4 wherein said means on each of said plungers includes at least two cam track followers to ensure positive actuation of said plungers toward and away from said cutters.

6. The apparatus of claim 5 wherein said cam track followers on each of said plungers are rollers arranged above and below said cam track.

7. The apparatus of claim 1 wherein said table rotates through a product loading station and a product cutting station, and wherein said plunger actuator means operates to cause said plunger to be moved away from said cutters at said loading station, and toward, into, and through said cutters at said at said cutting station.

8. The apparatus of claim 7 wherein said plunger actuator means is a cam track concentric with the rotation of said table.

9. The apparatus of claim 7 wherein said plunger actuator means is a cam track arranged to hold said plunger at or near its maximum distance from said cutter while said cutter passes through said loading station.

10. The apparatus of claim 7 wherein said plunger actuator means is a cam track arranged to cause said plunger to accelerate said product downwardly as said product passes through said cutters at said cutting station.

11. The apparatus of claim 7 further including a safety ledge at said loading station to prevent inadvertent movement of said plunger toward said cutters as the cutters pass through said loading station.

12. The apparatus of claim 7 further including contact switches adjacent said loading station arranged to stop operation of said apparatus if contacted during operation.

13. The apparatus of claim 7 further including an automatic feeder at said loading station to automatically provide product to said loading station for cutting by said apparatus.

14. The apparatus of claim 7 further including a receptacle and conveyor at said cutting station to receive and convey cut product from said apparatus.

15. The apparatus of claim 1 wherein said food products are whole fruit or vegetables.

16. The apparatus of claim 1 wherein said food products are processed fruit or vegetables.

17. The apparatus of claim 1 wherein said food products are citrus fruit.

18. The apparatus of claim 1 wherein said cutters are arranged to cut said products into sections.

19. The apparatus of claim 1 wherein said cutters are arranged to cut said products into slices.

20. The apparatus of claim 1 wherein said cutters are arranged to core and cut said products into sections.

21. The apparatus of claim 1 wherein said cutters are comprised of cups received in an aperture in said table, said cups containing said array of blades, and said cups being removable and replaceable to allow different configurations of said array of cutting blades.

22. The apparatus of claim 1 further including a flexible support means above said cutters arranged to releasably receive and support said product.

23. The apparatus of claim 1 wherein said plunger heads are removable and replaceable to accommodate different configurations of said array of cutting blades.

24. The apparatus of claim 1 further including a plunger guide means rotatable with said table and arranged to constrain each of said plungers to move toward and away from said cutters.

25. The apparatus of claim 24 wherein said plunger guide means comprises at least one plunger guide plate, said plate including a plurality of apertures to receive and guide the motion of said plungers.

26. The apparatus of claim 25 wherein said plunger guide means comprises two of said plunger guide plates.

27. The apparatus of claim 25 wherein said table and said plunger guide plate are affixed to a common central shaft to facilitate synchronous rotation with one another.

28. The apparatus of claim 25 wherein said table and said plunger guide plate are driven by a common rotating shaft that provides the motive force to rotate said table and said plate and to actuate said plungers.

29. The apparatus of claim 26 wherein said plungers include shafts that extend through said apertures in said guide plates, said shafts include a plurality of longitudinal planar surfaces, and said guide plates include bearing means adjacent said apertures, said bearing means arranged to bear against said planar surfaces to guide said plungers in said constrained movement toward and away from said cutters.

30. The apparatus of claim 29 wherein said plunger shafts are hexagonal in cross-section and said guide plates include three of said bearing means at each aperture bearing against three evenly spaced surfaces of said hexagonal shaft.

31. The apparatus of claim 29 wherein said bearing means are rollers.

32. The apparatus of claim 1 wherein said plunger head is provided with product contacting fingers sized and arranged to pass through said array of cutting blades.

* * * * *